United States Patent
Woo et al.

(10) Patent No.: US 9,100,781 B2
(45) Date of Patent: Aug. 4, 2015

(54) METHOD AND APPARATUS FOR TRANSMITTING LOCATION ESTIMATION MESSAGE IN WIRELESS COMMUNICATION SYSTEM

(75) Inventors: Kyung Soo Woo, Anyang-si (KR); Su Hwan Lim, Anyang-si (KR); Chi Jun Ahn, Anyang-si (KR); Dae Won Lee, Anyang-si (KR); Suk Hyon Yoon, Anyang-si (KR); Seung Hee Han, Anyang-si (KR)

(73) Assignee: LG ELECTRONICS INC., Seoul (KR)

(\*) Notice: Subject to any disclaimer, the term of this patent is extended or adjusted under 35 U.S.C. 154(b) by 180 days.

(21) Appl. No.: 13/808,880

(22) PCT Filed: Jul. 18, 2011

(86) PCT No.: PCT/KR2011/005273
§ 371 (c)(1),
(2), (4) Date: Jan. 7, 2013

(87) PCT Pub. No.: WO2012/008816
PCT Pub. Date: Jan. 19, 2012

(65) Prior Publication Data
US 2013/0122930 A1    May 16, 2013

Related U.S. Application Data

(60) Provisional application No. 61/364,818, filed on Jul. 16, 2010, provisional application No. 61/440,837, filed on Feb. 8, 2011, provisional application No. 61/441,122, filed on Feb. 17, 2011.

(51) Int. Cl.
| | |
|---|---|
| H04W 24/00 | (2009.01) |
| H04W 4/02 | (2009.01) |
| G01S 5/02 | (2010.01) |
| H04L 5/00 | (2006.01) |
| H04L 27/26 | (2006.01) |
| H04W 64/00 | (2009.01) |

(52) U.S. Cl.
CPC .............. *H04W 4/02* (2013.01); *G01S 5/0205* (2013.01); *H04L 5/0048* (2013.01); *H04L 5/0053* (2013.01); *H04L 5/0073* (2013.01); *H04L 27/2613* (2013.01); *H04L 27/2655* (2013.01); *H04W 64/00* (2013.01)

(58) Field of Classification Search
CPC .......... H04W 4/02; H04W 4/22; H04W 64/00
USPC .......... 455/456.1, 456.2, 456.3, 456.5, 456.6, 455/404.1, 404.2; 370/252, 328, 338
See application file for complete search history.

(56) References Cited

U.S. PATENT DOCUMENTS

| | | |
|---|---|---|
| 2011/0230144 A1* | 9/2011 | Siomina et al. .................. 455/68 |
| 2012/0040687 A1* | 2/2012 | Siomina et al. ............. 455/456.1 |
| 2012/0165053 A1* | 6/2012 | Yoon et al. ..................... 455/501 |
| 2013/0040673 A1* | 2/2013 | Siomina et al. ............... 455/501 |

FOREIGN PATENT DOCUMENTS

| | | |
|---|---|---|
| KR | 10-2009-0071009 | 7/2009 |
| KR | 10-2009-0085937 | 8/2009 |
| KR | 10-2010-0025845 | 3/2010 |

\* cited by examiner

*Primary Examiner* — San Htun
*Assistant Examiner* — Erica Navar
(74) *Attorney, Agent, or Firm* — McKenna Long & Aldridge LLP

(57) ABSTRACT

Provided are a method and an apparatus for transmitting a message through a terminal in a wireless communication system. The terminal receives positioning reference signals (PRS) from a reference cell and at least one of the neighbor cells, receives an auxiliary data provision message including a reference cell PRS muting sequence for indicating a muting pattern of the PRS transmitted through the reference cell and a neighbor cell PRS muting sequence for indicating the muting pattern of the PRS transmitted through at least one of the neighbor cells from an enhanced serving mobile location center (E-SMLC), and transmits a reference signal time difference (RSTD) measured on the basis of the PRS received from the reference cell and the at least one of the neighbor cells to the E-SMLC.

13 Claims, 15 Drawing Sheets

FIG. 5
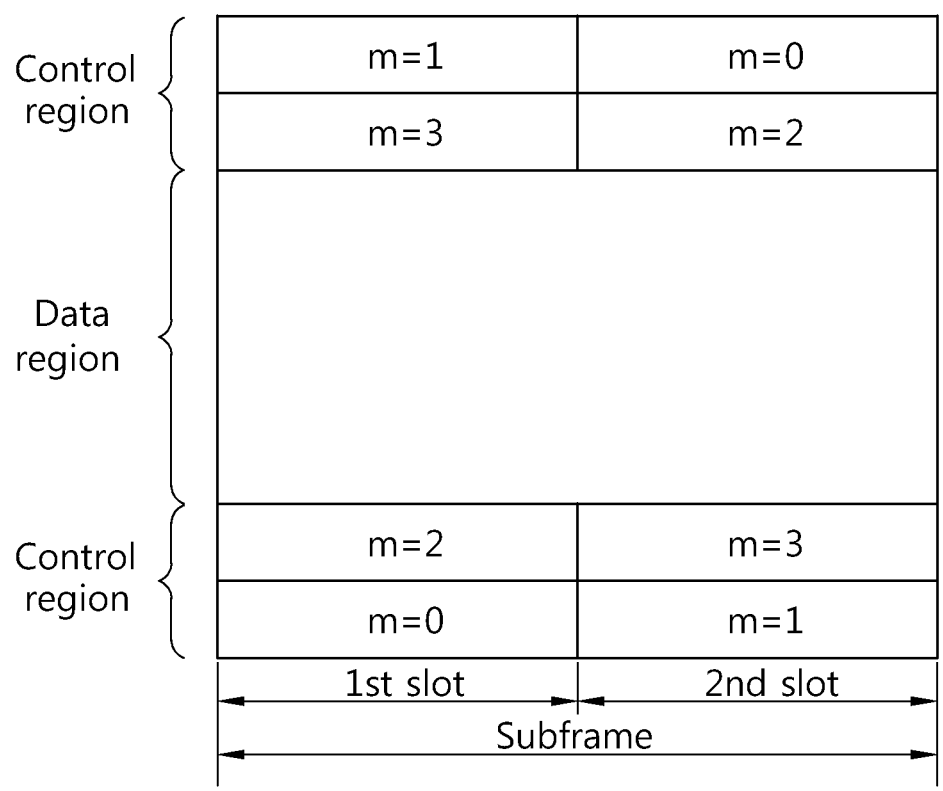
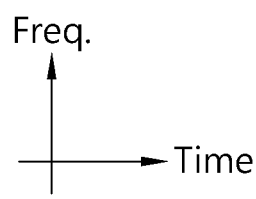

METHOD AND APPARATUS FOR TRANSMITTING LOCATION ESTIMATION MESSAGE IN WIRELESS COMMUNICATION SYSTEM

This Application is a 35 U.S.C. §371 National Stage Entry of International Application No. PCT/KR2011/005273, filed Jul. 18, 2011 and claims the benefit of U.S. Provisional Application Nos. 61/364,818, filed Jul. 16, 2010, 61/440,837, filed Feb. 8, 2011 and 61/444,122, filed Feb. 17, 2011, all of which are incorporated by reference in their entirety herein.

BACKGROUND OF THE INVENTION

1. Field of the Invention

The present invention relates to wireless communications, and more particularly, to a message transmission method and apparatus for location estimation in a wireless communication system.

2. Related Art

User equipment (UE) positioning for estimating a location of a UE has recently been used for various usages in real life, which requires a more accurate UE positioning method. The UE positioning method can be roughly classified into four methods as follows.

1) Global positioning system (GPS)-based method: In this method, a satellite is used to estimate the location of the UE. Information must be received from at least four satellites. Disadvantageously, this method cannot be used in an indoor environment.

2) Terrestrial positioning-based method: In this method, the location of the UE is estimated by using a timing difference of signals transmitted from base stations (BSs). Signals must be received from at least three BSs. Although this method has lower location estimation performance in comparison with the GPS-based method, it can be used in most of environments. A signal received from the BS may be a synchronization signal or a reference signal (RS), and according to a wireless communication system in use, can be defined in various terms, such as observed time difference of arrival (OTDOA) in UMTS terrestrial radio access network (UTRAN), enhanced observed time difference (E-OTD) in GSM/EDGE radio access network (GERAN), advanced forward link trilateration (AFLT) in CDMA2000, etc.

The RS can be used to estimate the location of the UE. The RS may include a synchronization signal. The UE can receive RSs transmitted from multiple cells, and can use a difference in a time delay of each signal. The UE may report the difference in the time delay to the BS so that the BS can calculate the location of the UE, or may autonomously calculate the location of the UE. Referring to the section 4.1.1 of 3rd generation partnership project (3GPP) long term evolution (LTE) TS36.355 V9.0.0(2009-12), an enhanced serving mobile location center (E-SMLC) can use a LTE positioning protocol (LPP) to control measurement values such as a reference signal time difference (RSTD) measured by the UE. The LPP can be defined as a point-to-point between a location server (e.g., E-SMLC, etc.) and a target device (i.e., UE, etc.) so that a location of the target device can be estimated using a location relation measurement value obtained from one or more RSs.

Meanwhile, RS transmission for UE location estimation may be muted. That is, a cell may not transmit the RS in a specific situation. This is because, when the UE receives an RS from a reference cell or a neighbor cell, strength of an RS received from the reference cell may be significantly greater than strength of an RS received from the neighbor cell, and in this case, the RS received from the neighbor cell may not be properly decoded. The UE needs to exactly know a muting pattern of RSs transmitted from multiple cells. The UE can recognize a muting pattern of an RS of each cell on the basis of at least one cell. However, due to such a reason as a handover of the UE or an asynchronous network or the like, there is a possibility that ambiguity occurs in which the UE cannot accurately recognize a muting pattern of an RS transmitted by each cell.

Accordingly, there is a need for a message configuration and transmission method by which a UE recognizes a muting pattern of an RS.

SUMMARY OF THE INVENTION

The present invention provides a message transmission method and apparatus for location estimation in a wireless communication system. The present invention also provides a message configuration method and a message transmission method for solving a system frame number (SFN) unknown problem when estimating a location of a terminal in a wireless communication system.

In an aspect, a method of transmitting a message by a terminal in a wireless communication system is provided. The method includes receiving a positioning reference signal (PRS) from each of a reference cell and at least one of neighbor cell, receiving from an enhanced serving mobile location center (E-SMLC) an assistance data provide message including a reference cell PRS muting sequence for indicating a muting pattern of the PRS transmitted by the reference cell and a neighbor cell PRS muting sequence for indicating a muting pattern of a PRS transmitted by the at least one of the neighbor cell, and transmitting to the E-SMLC a reference signal time difference (RSTD) measured on the basis of the PRS received from the reference cell or the at least one neighbor cell.

The reference cell muting sequence and the neighbor cell muting sequence may be configured on the basis of a system frame number (SFN) of a cell for which the SFN can be obtained by the terminal at a time of receiving the assistance data provide message.

The cell for which the SFN can be obtained by the terminal may be a serving cell for providing a service to the terminal.

A first bit of the reference cell muting sequence and the neighbor cell muting sequence may correspond to a first PRS occasion after the SFN of the cell for which the SFN can be obtained becomes 0.

The reference cell muting sequence and the neighbor cell muting sequence may be configured on the basis of a time of receiving the assistance data provide message.

A first bit of the reference cell muting sequence and the neighbor cell muting sequence may correspond to a first PRS occasion after the assistance data provide message is received.

The reference cell muting sequence and the neighbor cell muting sequence may be configured on the basis of an SFN of the reference cell obtained by decoding a physical broadcast channel (PBCH) transmitted from the reference cell.

Bits constituting the reference cell muting sequence or the neighbor cell muting sequence may be all 1 or 0.

The RSTD may be a relative delay of a reference subframe including the PRS received from the reference cell and a neighbor subframe including the PRS received from the at least one neighbor cell and corresponding to the reference subframe.

The method may further include transmitting to the E-SMLC an assistance data request message for requesting the assistance data provide message.

In another aspect, a terminal in a wireless communication system is provided. The terminal includes a radio frequency (RF) unit for transmitting or receiving a radio signal, and a processor coupled to the RF unit. The processor is configured for receiving a positioning reference signal (PRS) from each of a reference cell and at least one of neighbor cell, receiving from an enhanced serving mobile location center (E-SMLC) an assistance data provide message including a reference cell PRS muting sequence for indicating a muting pattern of the PRS transmitted by the reference cell and a neighbor cell PRS muting sequence for indicating a muting pattern of a PRS transmitted by the at least one of the neighbor cell, and transmitting to the E-SMLC a reference signal time difference (RSTD) measured on the basis of the PRS received from the reference cell or the at least one neighbor cell.

According to the present invention, a terminal can correctly recognize a muting pattern of a positioning reference signal (PRS) transmitted by each cell.

BRIEF DESCRIPTION OF THE DRAWINGS

FIG. 5 shows the structure of an uplink subframe.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
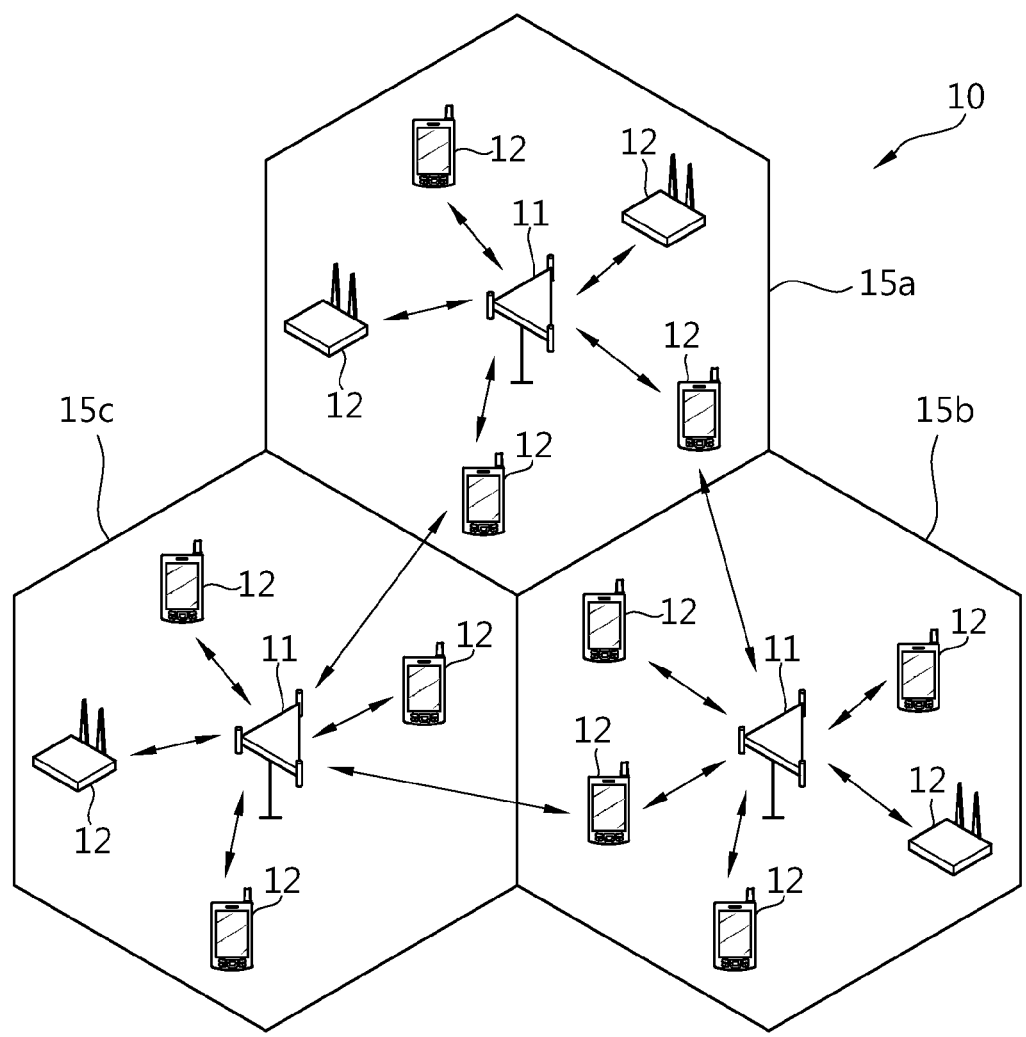
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
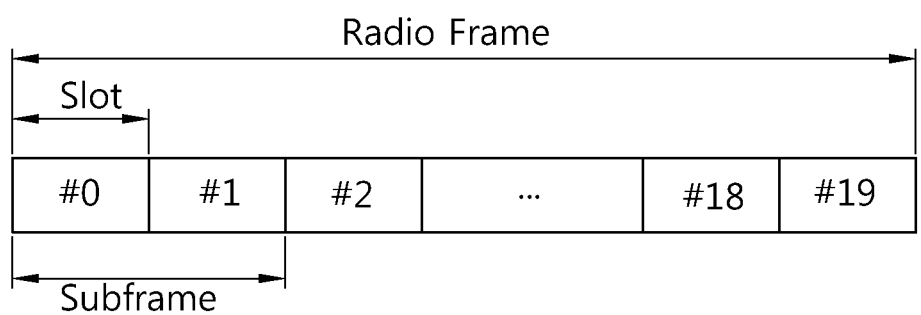
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
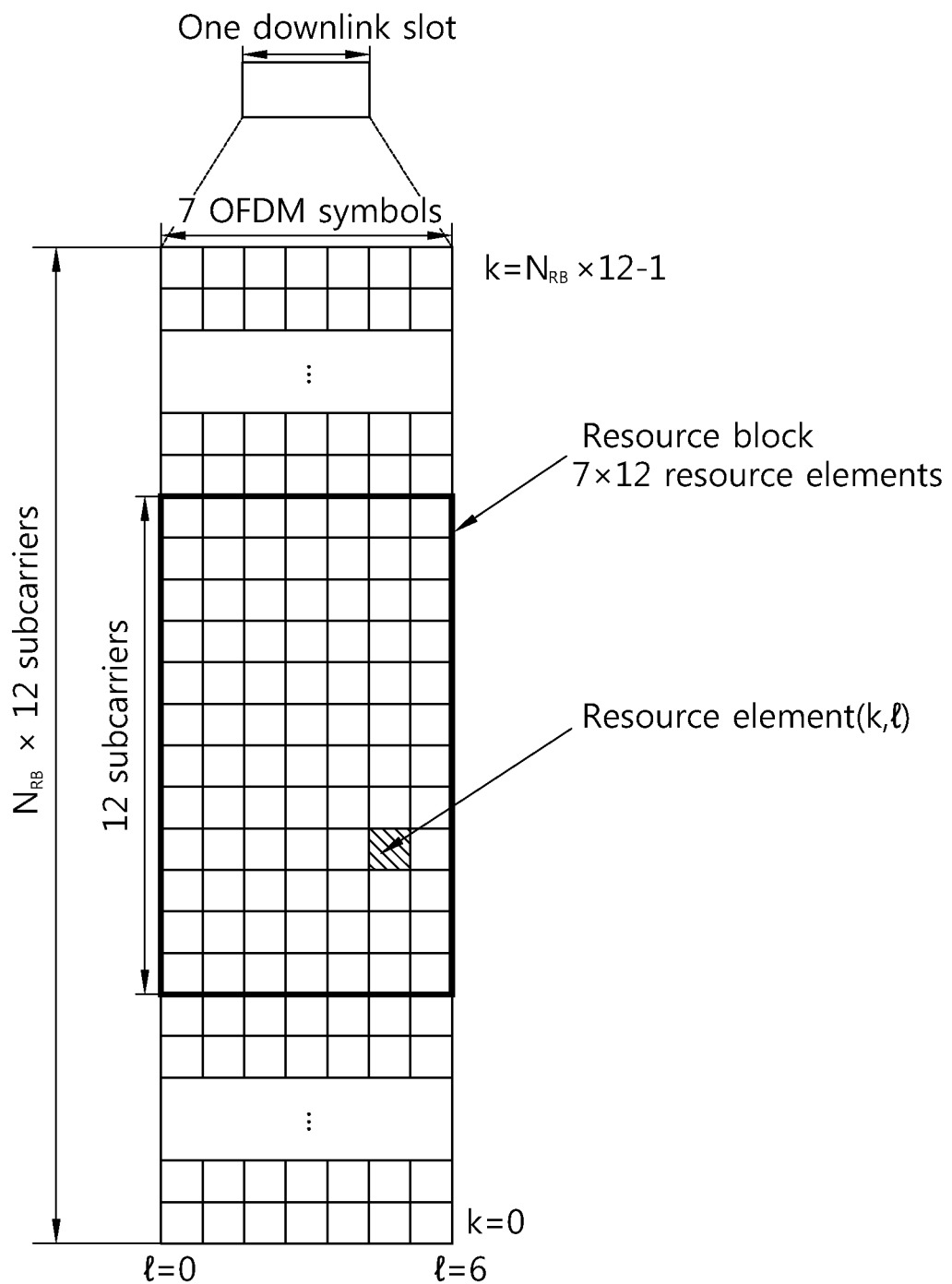
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k, l) in the slot. Here, k (k=0, . . . , $N_{RB}×12−1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
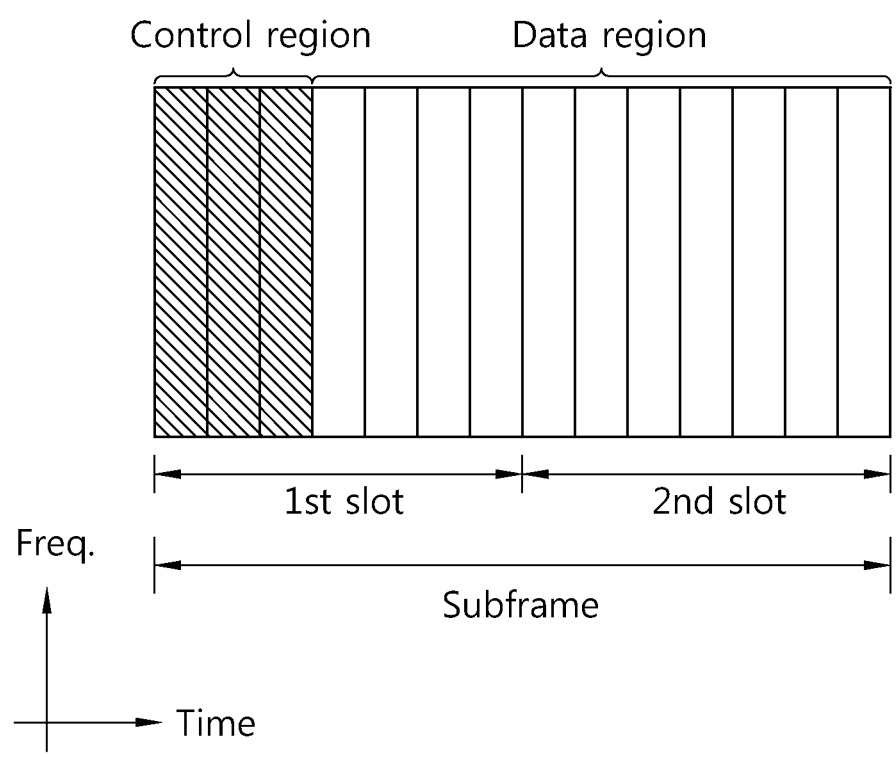
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereinafter, a reference signal is described below.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A downlink reference signal (RS) can be classified into a cell-specific RS (CRS), a multimedia broadcast and multicast single frequency network (MBSFN) RS, a UE-specific RS, a positioning RS (PRS), and a channel state information (CSI) RS (CSI-RS). The CRS is an RS transmitted to all UEs in a cell, and can be used in both data demodulation and channel estimation. The CRS can be transmitted in all downlink subframes in a cell supporting PDSCH transmission. The MBSFN RS is an RS for providing a multimedia broadcast multicast service (MBMS), and can be transmitted in a subframe allocated for MBSFN transmission. The MBSFN RS can be defined only in an extended cyclic prefix (CP) structure. The UE-specific RS is an RS received by a specific UE or a specific UE group in the cell, and can also be called a dedicated RS (DRS). Alternatively, the UE-specific RS can also be called a demodulation RS (DMRS) since it is primarily used in data demodulation of a specific UE or a specific UE group. The CSI-RS can be used for estimation of channel state information in a 3GPP LTE-A system. The CSI-RS is relatively sparely arranged in a frequency domain or a time domain. The CSI-RS can be punctured in a data region of a normal subframe or an MBSFN subframe. If required, a channel quality indicator (CQI), a precoding matrix indicator (PMI), a rank indicator (RI), etc., can be reported from the UE through CSI estimation. The CSI-RS can be transmitted through 1, 2, 4, or 8 antenna ports.

The PRS is an RS defined for UE location estimation. The PRS can be transmitted through a resource block in a downlink subframe configured for PRS transmission. The downlink subframe configured for PRS transmission can also be called a positioning subframe. If the normal subframe and the MBSFN subframe are both configured as positioning subframes in a cell, an OFDM symbol configured for PRS transmission in the MBSFN subframe uses the same CP structure as that used in a first subframe of a radio frame. If only the MBSFN subframe is configured as the positioning subframe in the cell, the OFDM symbol configured for PRS transmission uses an extended CP structure. The PRS is not mapped to a resource element to which a physical broadcast channel (PBCH), a primary synchronization signal (PSS), or a secondary synchronization signal (SSS) is mapped. In addition, the PRS can be defined for $\Delta f = 15$ kHz.

A PRS sequence can be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \langle\text{Equation 1}\rangle$$

In Equation 1, $n_s$ denotes a slot number in a radio frame, and l denotes an OFDM symbol number in a slot. m is 0, 1, ..., $2N_{RB}^{max,DL}-1$. $2N_{RB}^{max,DL}$ denotes the number of resource blocks corresponding to a maximum bandwidth in a downlink. For example, $2N_{RB}^{max,DL}$ is 110 in 3GPP LTE. c(i) is a PN sequence and is a pseudo-random sequence. The PN sequence can be defined by a length-31 gold sequence. Equation 2 shows an example of the gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{<Equation 2>}$$

Herein, Nc is 1600, x(i) is a first m-sequence, and y(i) is a second m-sequence. For example, the first m-sequence or the second m-sequence may be initialized in each OFDM symbol according to a cell ID, a slot number in a radio frame, an OFDM symbol index in a slot, a CP type, etc. A pseudo-random sequence generator can be initialized as $c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$ at the start of each radio frame. In case of a normal CP, $N_{CP}$ is 1. In case of an extended CP, $N_{CP}$ is 0.

A PRS sequence $r_{l,n_s}(m)$ can be mapped to a complex modulation symbol $a_{k,l}^{(p)}$ in a slot $n_s$ according to Equation 3.

$$a_{k,l}^{(p)} = r_{l,n_s}(m') \quad \text{<Equation 3>}$$

In a normal CP case, k, l, m, m' of Equation 3 can be determined by Equation 4.

$$k = 6(m + N_{RB}^{DL} - N_{RB}^{PRS}) + (6 - l + v_{shift}) \bmod 6 \quad \langle\text{Equation 4}\rangle$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In an extended CP case, k, l, m, m' of Equation 3 can be determined by Equation 5.

$$k = 6(m + N_{RB}^{DL} - N_{RB}^{PRS}) + (5 - l + v_{shift}) \bmod 6 \quad \langle\text{Equation 5}\rangle$$

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

In Equation 4 or Equation 5, $N_{RB}^{PRS}$ can be configured by higher layers, and a cell-specific frequency shift $v_{shift}$ can be given as $v_{shift} = N_{cell}^{ID} \bmod 6$.

Figure 6:
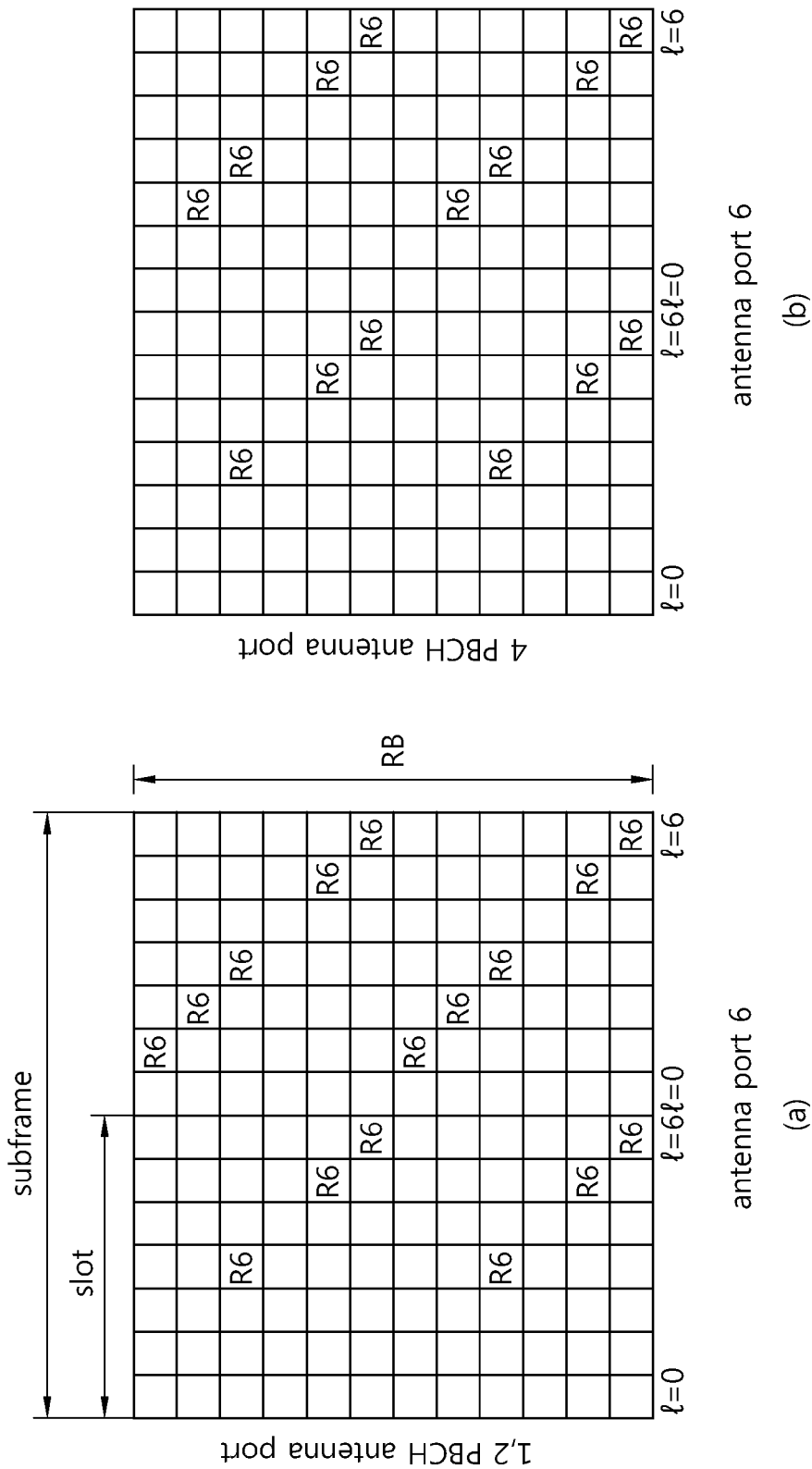
FIG. 6 and FIG. 7 show an example of a PRS pattern mapped to a resource block.
Figure 7:
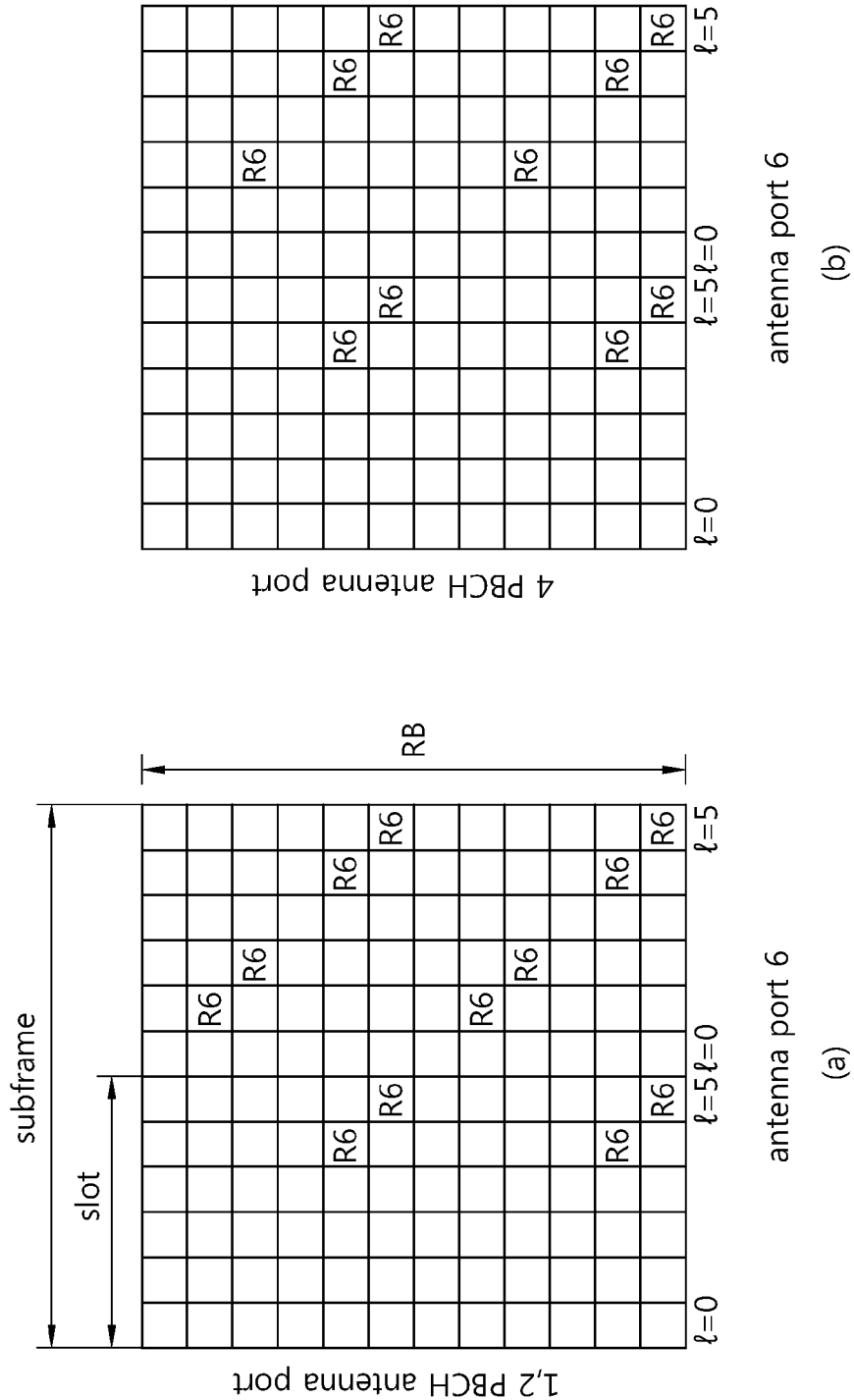

FIG. 6 and FIG. 7 show an example of a PRS pattern mapped to a resource block.

FIG. 6 shows a case of mapping a PRS to a resource block in a normal CP case. FIG. 6A shows a PRS pattern when the number of PBCH antenna ports is 1 or 2. FIG. 6B shows a PRS pattern when the number of PBCH antenna ports is 4. FIG. 7 shows a case of mapping a PRS to a resource block in an extended CP case. FIG. 7A shows a PRS pattern when the number of PBCH antenna ports is 1 or 2. FIG. 7B shows a PRS pattern when the number of PBCH antenna ports is 4. The PRS is mapped to a diagonal pattern in a resource block.

Table 1 shows a cell-specific subframe configuration period $T_{PRS}$ and a cell-specific subframe offset $\Delta_{PRS}$. A PRS configuration index $I_{PRS}$ can be given by a higher layer. The PRS can be transmitted only in a downlink subframe configured for PRS transmission. The PRS cannot be transmitted in a special subframe of a TDD system. The PRS can be transmitted in $N_{PRS}$ contiguous downlink subframes, and $N_{PRS}$ can be given by the higher layer. In addition, among the $N_{PRS}$ contiguous downlink subframes, $(10 \times n_f + \lfloor n_s/2 \rfloor - \Delta_{PRS}) \bmod T_{PRS} = 0$ can be satisfied for a first subframe.

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0 - 159 | 160 | $I_{PRS}$ |
| 160 - 479 | 320 | $I_{PRS}$-160 |
| 480 - 1119 | 640 | $I_{PRS}$-480 |
| 1120 - 2399 | 1280 | $I_{PRS}$-1120 |
| 2400 - 4095 | Reserved | |

A method of estimating a location of a UE can be classified into a GPS-based method and a terrestrial positioning-based method. The terrestrial positioning-based method estimates the location of the UE by using a timing difference of signals transmitted from BSs. Signals must be received from at least three BSs. Although this method has lower location estimation performance in comparison with the GPS-based method, this method can be used in most of environments. A signal received from the BS may be a synchronization signal or a reference signal (RS).

Figure 8:
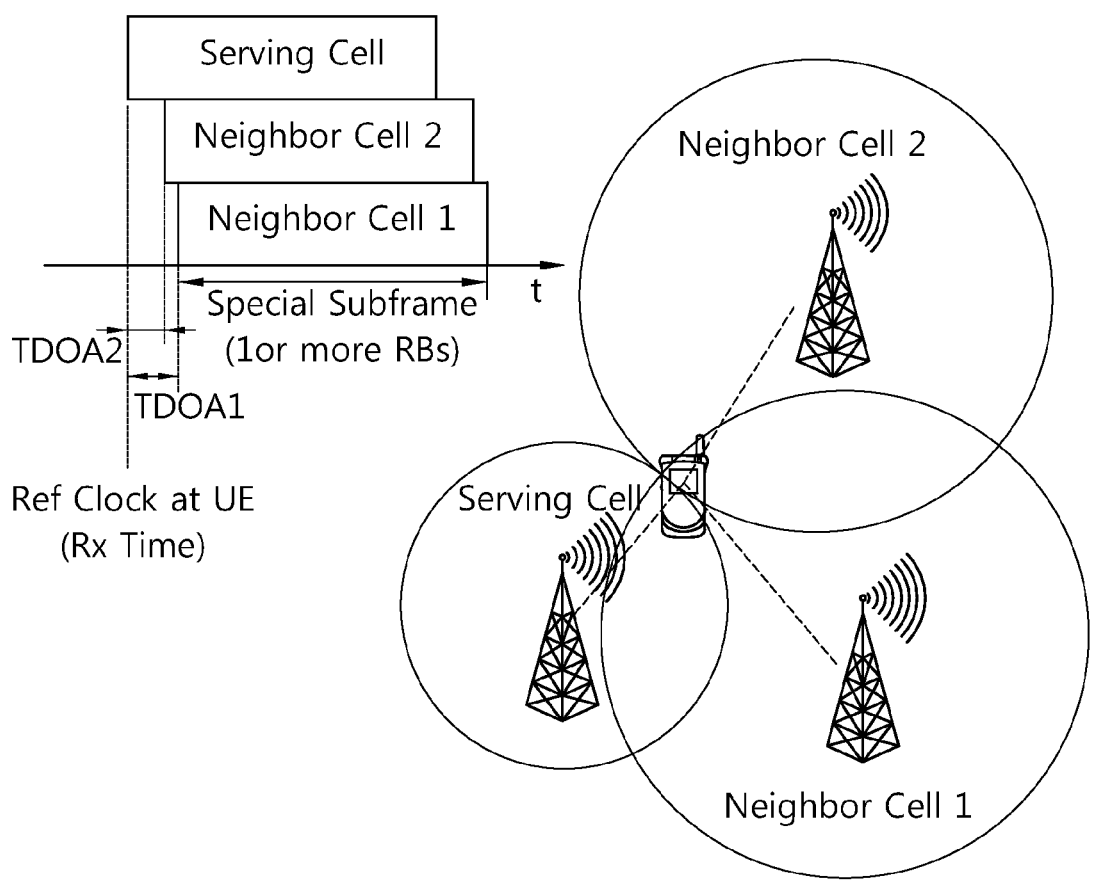
FIG. 8 shows an example of operating an observed time difference of arrival (OTDOA) method as a terrestrial positioning-based method.

FIG. 8 shows an example of operating an observed time difference of arrival (OTDOA) method as a terrestrial positioning-based method. A UE measures a reference clock on the basis of a subframe transmitted in a serving cell currently receiving a service. A subframe is received from a neighbor cell 2 at a time elapsed by a TDOA 2 from the reference clock. A subframe is received from a neighbor cell 1 at a time elapsed by a TDOA 1, longer than the TDOA 2, from the reference clock. A PRS may be included in each subframe transmitted from multiple cells.

The UE can estimate the location of the UE according to a difference in a reception time of a PRS transmitted from the serving cell and the neighbor cell. A reference signal time difference (RSTD) between a neighbor cell j and a reference cell i can be defined as $T_{subframeRxj} - T_{subframeRxi}$, and can be found in the section 5.1.12 of 3GPP TS 36.214 V9.1.0 (2010-03) 5.1.12. $T_{subframeRxj}$ denotes a time at which the UE receives a start part of one subframe from the cell j. $T_{subframeRxi}$ denotes a time at which a start part of corresponding one subframe is received from the cell i, which is the closest in time to the subframe received from the cell j by the UE. A reference point for measuring the RSTD may be an antenna connector of the UE.

Figure 9:
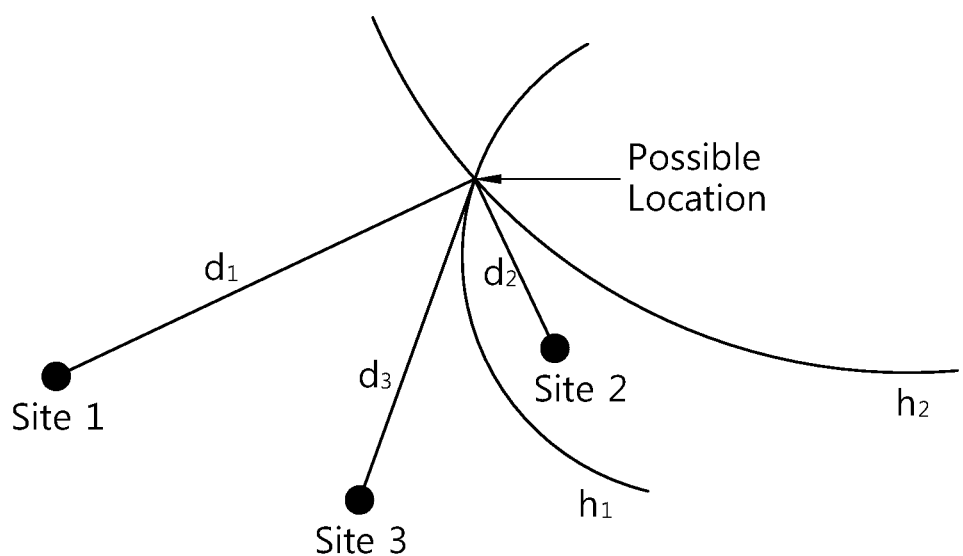
FIG. 9 shows another example of operating a downlink OTDOA method as a terrestrial positioning-based method.

FIG. 9 shows another example of operating a downlink OTDOA method as a terrestrial positioning-based method. A location of a UE can be estimated by solving a linearlized equation by the use of a Taylor series expansion. This can be found in [Y. Chan and K. Ho, "A simple and efficient estimator for hyperbolic location," IEEE Trans. Signal Processing, vol. 42, pp. 1905-1915, August 1994].

If the location of the UE is estimated by using the downlink OTDOA method, the UE and an enhanced serving mobile location center (E-SMLC) can mutually exchange information according to an LTE positioning protocol (LPP). The UE can measure OTDOA of RSs transmitted by multiple BSs and transmit a measurement result to the E-SMLC through the LPP. The E-SMLC can transmit assistance data required by the UE for the measurement to the UE through the LPP.

Figure 10:
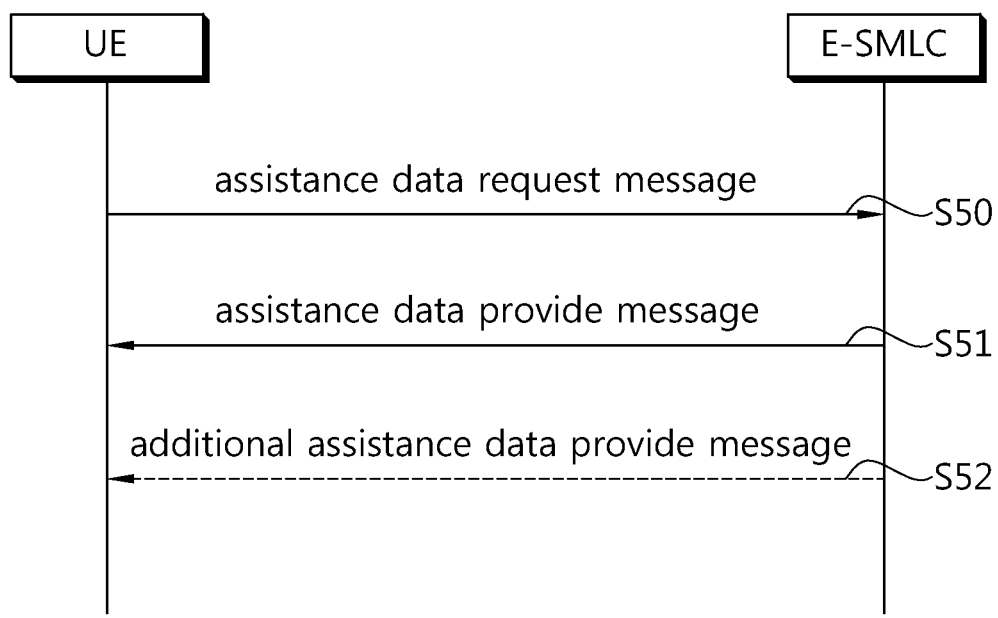
FIG. 10 shows an example of an assistance data exchange process between a UE and an E-SMLC through an LPP.

FIG. 10 shows an example of an assistance data exchange process between a UE and an E-SMLC through an LPP. Through the assistance data exchange process, the UE can request the E-SMLC to transmit assistance data required for location estimation, and can receive the assistance data from the E-SMLC. This can be found in the section 5.2.1 of 3GPP TS36.355 V9.2.1(2010-06).

In step S50, the UE transmits an assistance data request message to the E-SMLC. In step S51, the E-SMLC transmits an assistance data provide message including the assistance data to the UE. The transmitted assistance data may be matched to the assistance data request message requested by the UE or may be a subset of the message. In step S52, the E-SMLC can transmit one or more additional assistance data provide messages including additional assistance data to the UE. The additional assistance data may also be matched to the assistance data request message requested by the UE or may be a subset of the message. Meanwhile, a finally transmitted assistance data provide message may include information indicating the end of the assistance data exchange.

In the downlink OTDOA method, the assistance data provide message can be transmitted using an OTDOA assistance data provide (i.e., OTDOA-ProvideAssistanceData) information element (IE). Table 2 shows an example of the OTDOA-ProvideAssistanceData IE. This can be found in the section 6.5.1 of 3GPP TS36.355 V9.4.0(2010-12).

TABLE 2

```
-- ASN1START
OTDOA-ProvideAssistanceData ::= SEQUENCE {
    otdoa-ReferenceCellInfo         OTDOA-ReferenceCellInfo
        OPTIONAL,
    otdoa-NeighbourCellInfo         OTDOA-NeighbourCellInfoList
        OPTIONAL,
    otdoa-Error                     OTDOA-Error
        OPTIONAL,
    ...
}
-- ASN1STOP
```

Referring to Table 2, the OTDOA-ProvideAssistanceData IE includes an OTDOA reference cell information (i.e., OTDOA-ReferenceCellInfo) IE and an OTDOA neighbor cell information list (i.e., OTDOA-NeighbourCellInfoList) IE. In this case, if the UE cannot acquire any SFN from any cell, a criterion for OTDOA measurement cannot be determined, and thus OTDOA measurement cannot be performed, thereby disabling UE location estimation. Therefore, a solution of this problem can be proposed by defining at least one cell for which an SFN can be obtained by the UE or by including it to a neighbor cell list.

Table 3 shows an example of the OTDOA-ReferenceCellInfo IE. The E-SMLC can transmit information of a reference cell used as a criterion of OTDOA measurement to the UE according to the OTDOA-ReferenceCellInfo IE.

TABLE 3

```
-- ASN1START
OTDOA-ReferenceCellInfo ::= SEQUENCE {
    physCellId          INTEGER (0..503),
    cellGlobalId        ECGI                OPTIONAL,       -- Need ON
    earfcnRef           ARFCN-ValueEUTRA    OPTIONAL,       -- Cond NotSameAsServ0
    antennaPortConfig   ENUMERATED {ports1-or-2, ports4, ... }
                                            OPTIONAL,       -- Cond NotSameAsServ1
    cpLength            ENUMERATED { normal, extended, ... },
    prsInfo             PRS-Info            OPTIONAL,       -- Cond PRS
    ...
}
-- ASN1STOP
```

In Table 3, PRS information (i.e., PRS-Info) IE indicates a PRS configuration of a reference cell. Table 4 shows an example of the PRS-Info IE.

TABLE 4

```
-- ASN1START
PRS-Info ::= SEQUENCE {
    prs-Bandwidth           ENUMERATED { n6, n15, n25, n50, n75, n100, ... },
    prs-ConfigurationIndex  INTEGER (0..4095),
    numDL-Frames            ENUMERATED {sf-1, sf-2, sf-4, sf-6, ...},
    ...,
    prs-MutingInfo-r9   CHOICE {
        po2-r9                              BIT STRING (SIZE(2)),
        po4-r9                              BIT STRING (SIZE(4)),
        po8-r9                              BIT STRING (SIZE(8)),
        po16-r9                             BIT STRING (SIZE(16)),
        ...
    }                       OPTIONAL                            -- Need OP
}
-- ASN1STOP
```

In Table 4, a prs-Bandwidth field indicates a bandwidth used for PRS transmission. The prs-Bandwidth field can indicate the number of resource blocks for PRS transmission. A prs-ConfigurationIndex field indicates a PRS configuration index $I_{PRS}$ of Table 1. A numDL-Frames field indicates the number $N_{PRS}$ of contiguous downlink subframes in which the PRS is transmitted. A value of the numDL-Frames field may be 1, 2, 4, or 6.

In Table 4, a prs-MutingInfo field indicates a PRS muting configuration of a reference cell. The PRS muting configuration can be defined by a periodic PRS muting sequence having a period $T_{REP}$. $T_{REP}$ can be defined as the number of PRS occasions, and may have any one value among 2, 4, 8, and 16. Each PRS occasion can be defined as $N_{PRS}$ contiguous downlink subframes in which the PRS is transmitted. $T_{REP}$ is equal to a length of a selected bit string indicating a PRS muting sequence. For example, if $T_{REP}=2$, the length of the bit string is also 2. If a bit value of the PRS muting sequence is 0, PRS transmission is muted in a corresponding PRS occasion. A PRS muting pattern based on the PRS muting sequence can be configured on the basis of a case where a system frame number (SFN) of a reference cell is 0. That is, a first bit of the PRS muting sequence may correspond to a first PRS occasion that starts after the SFN of the reference cell becomes 0. The PRS muting sequence is valid for all subframes after the UE receives the PRS muting information field. If the PRS muting information field is not provided, the UE may assume that PRS muting is not applied to the reference cell.

Table 5 shows an example of an OTDOA neighbor cell information list (i.e., OTDOA-NeighbourCellInfoList) IE. The E-SMLC can transmit neighbor cell information required for OTDOA measurement to the UE according to the OTDOA-NeighbourCellInfo IE. In the OTDOA-NeighbourCellInfoList IE, information on each neighbor cell can be sorted in a descending order of importance of neighbor cells measured by the UE. That is, in OTDOA measurement, a neighbor cell having a highest priority may be a first cell. The UE measures the OTDOA according to an order of cells in the OTDOA-NeighbourCellInfoList IE provided by the E-SMLC. Meanwhile, in the OTDOA-NeighbourCellInfoList IE, a slot number offset field (i.e., slotNumberOffset) and an expected RSTD field (i.e., expectedRSTD) can be defined relatively for each cell on the basis of a reference cell.

TABLE 5

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId          INTEGER (0..503),
    cellGlobalId        ECGI                OPTIONAL,   -- Need ON
    earfcn              ARFCN-ValueEUTRA    OPTIONAL,   -- Cond
                                                            NotSameAsRef0
```

TABLE 5-continued

| | | | |
|---|---|---|---|
| cpLength | ENUMERATED {normal, extended, ...} | | |
| | OPTIONAL, | | -- |
| Cond NotSameAsRef1 | | | |
| prsInfo | PRS-Info | OPTIONAL, | -- Cond |
| NotSameAsRef2 | | | |
| antennaPortConfig | ENUMERATED {ports-1-or-2, ports-4, ...} | | |
| | OPTIONAL, | | -- Cond |
| NotsameAsRef3 | | | |
| slotNumberOffset | INTEGER(0..31) | OPTIONAL, | -- Cond |
| NotSameAsRef4 | | | |
| prs-SubframeOffset | INTEGER (0..1279) | OPTIONAL, | -- Cond InterFreq |
| expectedRSTD | INTEGER (0..16383), | | |
| expectedRSTD-Uncertainty | INTEGER (0..1023), | | |
| ... | | | |
| } | | | |
| maxFreqLayers   INTEGER ::= 3 | | | |
| -- ASN1STOP | | | |

Referring to Table 5, OTDOA neighbor cell information of each neighbor cell includes a PRS-Info IE similarly to the OTDOA-ReferenceCellInfo IE of Table 3. Accordingly, PRS muting can be configured with respect to each neighbor cell as shown in Table 4.

Meanwhile, if the location of the UE is estimated by the downlink OTDOA method, the BS and the E-SMLC can mutually exchange information by an LPP annex (LPPa). The LPPa provides a control plane radio network layer signaling process between the BS and the E-SMLC.

Figure 11:
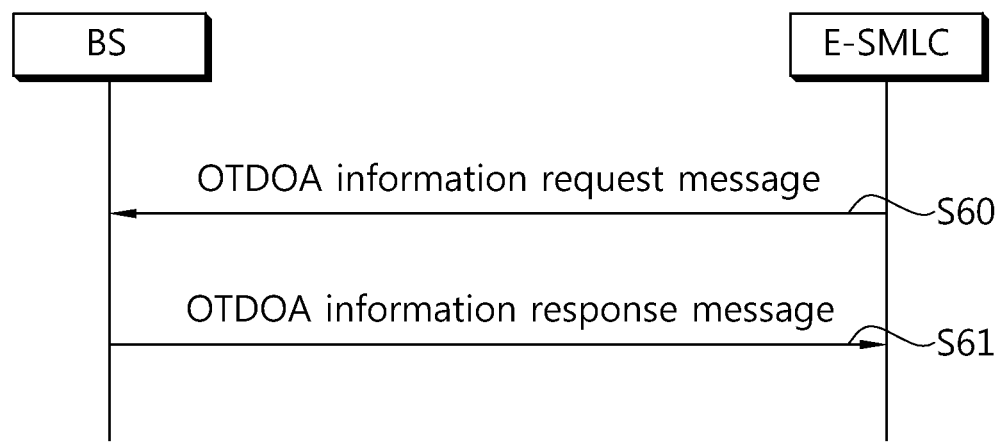
FIG. 11 shows an example of a data exchange process between a BS and an E-SMLC through an LPPa.

FIG. 11 shows an example of a data exchange process between a BS and an E-SMLC through an LPPa. This can be found in the section 8.2.5 of 3GPP TS36.455 V9.2.0(2010-06).

In step S60, the E-SMLC transmits an OTDOA information request message to a BS. The E-SMLC initializes the information exchange process between the E-SMLC and the BS by transmitting the OTDOA information request message. In step S61, the BS transmits an OTDOA information response message to the E-SMLC. The OTDOA information response message includes OTDOA cell information of cells related to estimation of a location of a UE.

The BS can operate by using parameters such as a PRS configuration index configured for each BS, an SFN initialization time, a PRS muting configuration, etc. Table 6 shows an example of each cell's OTDOA cell information transmitted by the UE.

TABLE 6

| IE/Group Name | Presence | Range | IE type and reference | Semantics description |
|---|---|---|---|---|
| OTDOA Cell Information | | 1 to <maxnoOTDOAtypes> | | |
| >CHOICE OTDOA Cell Information Item | M | | | |
| >>PCI | M | | INTEGER (0 ... 503, ...) | Physical Cell ID |
| >>Cell ID | M | | ECGI 9.2.6 | |
| >>TAC | M | | OCTET STRING (2) | Tracking Area Code |
| >>EARFCN | M | | INTEGER (0 ... 65535) | Corresponds to $N_{DL}$ for FDD and $N_{DL/UL}$ for TDD in ref. [5] |
| >>PRS Bandwidth | M | | ENUMERATED (bw6, bw15, bw25, bw50, bw75, bw100, ...) | Transmission bandwidth of PRS |
| >>PRS Configuration Index | M | | INTEGER (0 ... 4095) | PRS Configuration Index, ref [6] |
| >>CP Length | M | | ENUMERATED (Normal, Extended, ...) | Cyclic prefix length of the PRS |
| >>Number of DL Frames | M | | ENUMERATED (sf1, sf2, sf4, sf6, ...) | Number of consecutive downlink subframes $N_{PRS}$ with PRS, ref [6] |
| >>Number of Antenna Ports | M | | ENUMERATED(n1-or-n2, n4, ...) | Number of used antenna ports, where n1-or-n2 corresponds to 1 or 2 ports, n4 corresponds to 4 ports |
| >>SFN Initialisation Time | M | | BIT STRING (64) | Time in seconds relative to 00:00:00 on 1 Jan. 1900 where the integer part is in the first 32 bits and the fraction part in the last 32 bits |

TABLE 6-continued

| IE/Group Name | Presence | Range | IE type and reference | Semantics description |
|---|---|---|---|---|
| >>E-UTRAN Access Point Position | M | | 9.2.8 | The configured estimated geographical position of the antenna of the cell. |
| >>PRS Muting Configuration | M | | 9.2.9 | The configuration of positioning reference signals muting pattern, when applicable |

Meanwhile, when the UE recognizes each cell's PRS muting sequence and PRS muting pattern, an SFN unknown problem may occur. When the UE knows the PRS muting sequence and the PRS muting pattern on the basis of the SFN of the reference cell but does not know the SFN of the reference cell, the SFN unknown problem may occur. For example, the PRS muting pattern can be configured starting from a time at which the SFN of the reference cell becomes 0. In this case, if the UE does not know the SFN of the reference cell, the UE cannot know whether a next PRS occasion is muted or not. In general, the UE knows only an SFN of a serving cell in which a service of the UE is provided. Since the reference cell does not coincide with the serving cell in a process of performing a handover or the like of the UE, the SFN unknown problem may frequently occur.

Figure 12:
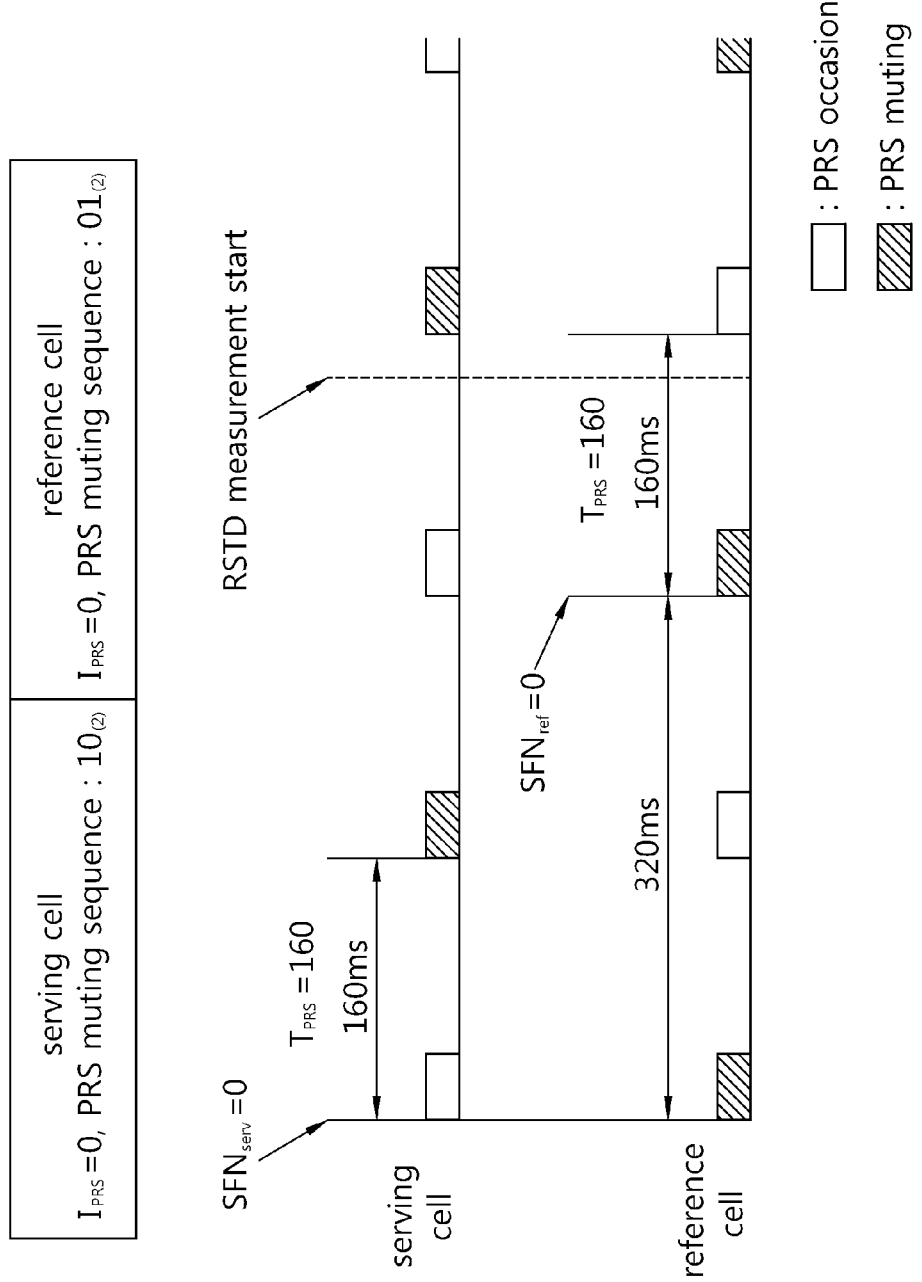
FIG. 12 and FIG. 13 show an example of a case where an SFN unknown problem occurs.
Figure 13:
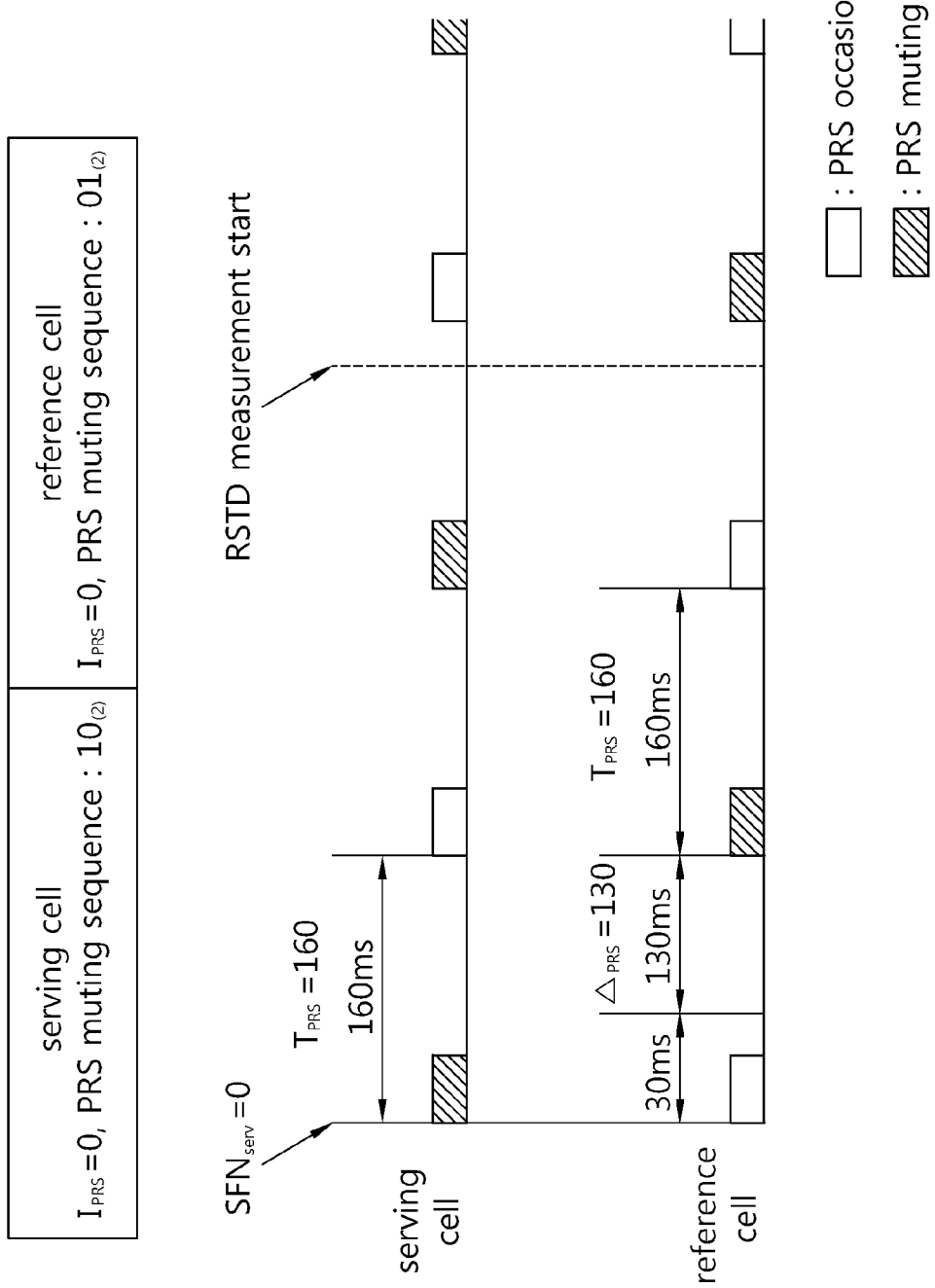

FIG. 12 and FIG. 13 show an example of a case where an SFN unknown problem occurs.

In FIG. 12 and FIG. 13, it is assumed that a serving cell is included in an OTDOA neighbor cell list. That is, the serving cell does not coincide with a reference cell. In addition, it is also assumed that there is no propagation delay, and the UE knows only the SFN of the serving cell. The UE can estimate a PRS occasion by using a slot number offset and an SFN of the serving cell which is one of neighbor cells, and can measure an RSTD by using the estimated PRS occasion. However, since the UE does not know a time at which an SFN of the reference cell is 0, the UE cannot know whether a next PRS occasion is muted or not. Accordingly, the RSTD cannot be properly measured.

In FIG. 12, a PRS configuration index $I_{PRS}$ is 0 for both of the serving cell and the reference cell. An SFN offset of the serving cell and the reference cell is 320 ms. A muting sequence of the serving cell is $10_{(2)}$, and a muting sequence of the reference cell is $01_{(2)}$. Since the UE does not know a time at which the SFN of the reference cell becomes 0, the UE cannot know whether a PRS occasion happened after measuring of the RSTD is muted or not.

In FIG. 13, a PRS configuration index $I_{PRS}$ of a serving cell is 0, and a PRS configuration index $I_{PRS}$ of a reference cell is 130. An SFN offset of the serving cell and the reference cell is 30 ms. A muting sequence of the serving cell is $10_{(2)}$, and a muting sequence of the reference cell is $01_{(2)}$. Since the UE does not know a time at which the SFN of the reference cell becomes 0, the UE cannot know whether a PRS occasion happened after measuring of the RSTD is muted or not.

Meanwhile, the SFN unknown problem may also occur in case of an asynchronous network in which multiple cells are asynchronous. In case of a synchronous network in which the multiple cells are synchronous, the UE can predict the SFN of the reference cell on the basis of the serving cell receiving a service, and thus can know a muting pattern of a PRS transmitted by each cell. However, in case of the asynchronous network, there is a possibility that the UE cannot recognize the SFN of the reference cell, and thus the UE cannot know a time at which the PRS transmitted by each cell is muted. In this case, the UE must acquire SFN information of the reference cell by decoding a PBCH. Therefore, a complexity of the UE is increased, and if a signal to interference noise ratio (SINR) of a signal received from the reference cell is small, decoding performance of the PBCH is decreased, and thus the SFN information of the reference cell may not be properly acquired.

Accordingly, there is a need for a method for solving the SFN known problem.

1) At a time in which the UE receives PRS muting information, a PRS muting sequence and a PRS muting pattern can be configured on the basis of an SFN of a cell for which the SFN can be obtained by the UE. The UE can recognize a PRS muting pattern of each cell on the basis of an SFN of a cell for which the SFN can be acquired at a time of receiving the PRS muting information. In this case, the cell for which the SFN can be obtained by UE may be a serving cell. A PRS muting pattern based on the PRS muting sequence can be configured on the basis of a case in which the SFN of the cell for which the SFN can be obtained by the UE is 0. That is, a first bit of the PRS muting sequence may correspond to a first PRS occasion that starts after the SFN of the cell for which the SFN can be obtained by the UE becomes 0. Alternatively, the first bit of the PRS muting sequence may correspond to a first PRS occasion that starts after an SFN of a serving cell becomes 0 when the UE receives PRS muting information. Accordingly, the SFN unknown problem can be solved except for a case in which the UE performs a handover.

2) A PRS muting sequence and a PRS muting pattern can be configured on the basis of a first PRS occasion received by the UE. That is, the UE does not require an SFN of any one cell in which a PRS is transmitted, and can recognize the PRS muting sequence and the PRS muting pattern on the basis of a time at which PRS muting information is received. Accordingly, the first bit of the PRS muting sequence may correspond to a first PRS occasion received after the UE receives the PRS muting information. Alternatively, the first bit of the PRS muting sequence may correspond to a first PRS occasion received after OTDOA assistance data is delivered to the UE by using the OTDOA-ProvideAssistanceData IE.

3) The PRS muting sequence and the PRS muting pattern can be configured on the basis of the SFN of the reference cell, and the UE can acquire the SFN by decoding the PBCH transmitted from the reference cell. Alternatively, the PRS-Info IE may additionally include an SFN offset field or an SFN itself, and thus the UE can estimate the PRS muting sequence and the PRS muting pattern by acquiring the SFN of the reference cell. An SFN offset field or an SFN value can be added to the PRS-Info IE for the serving cell or the reference cell. Alternatively, the UE can acquire an SFN of a cell for which the SFN can be obtained by the UE and an SFN of the reference cell from the SFN or an SFN offset field of the reference cell, and thus can estimate the PRS muting sequence and the PRS muting pattern.

4) All of bits constituting the PRS muting sequence can be configured with 0 or 1. If the PRS muting sequence is '11 . . . ', the PRS is transmitted always in all PRS occasions, and if the PRS muting sequence is '00 . . . ', PRS transmission is always muted in all PRS occasions. Accordingly, the SFN unknown problem can be solved without having to identify the SFN of the reference cell in order for the UE to know the PRS muting pattern.

Figure 14:
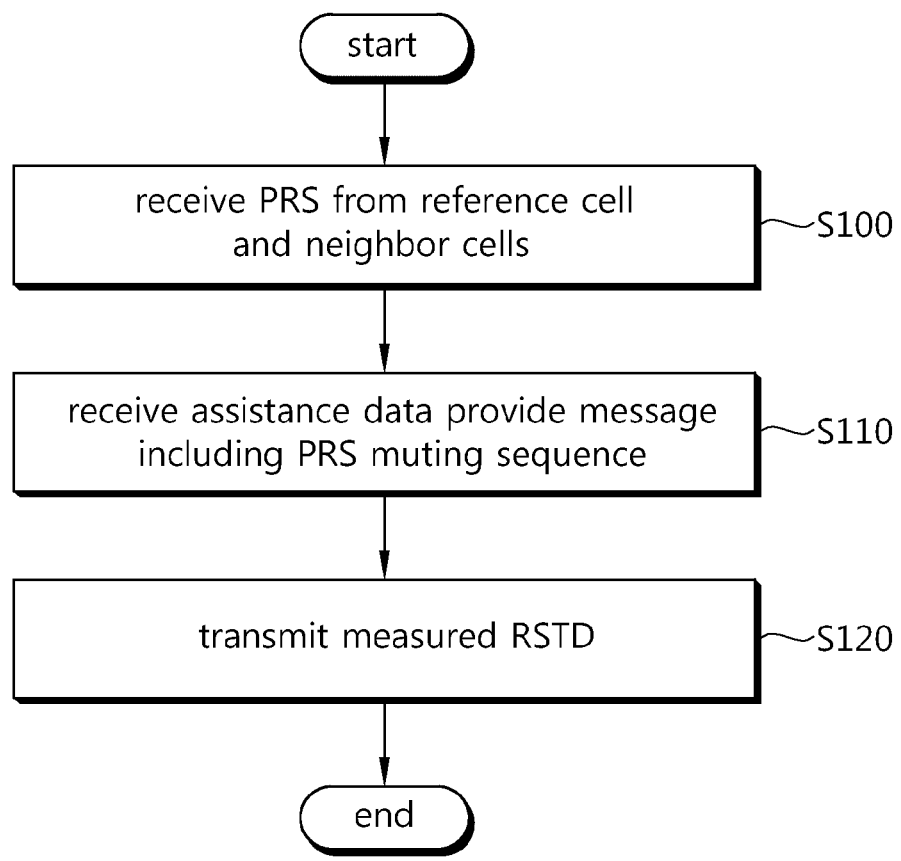
FIG. 14 shows the proposed message transmission method for location estimation according to an embodiment of the present invention.

FIG. 14 shows the proposed message transmission method for location estimation according to an embodiment of the present invention.

In step S100, a UE receives a PRS from each of a reference cell and at least one neighbor cell. In step S110, the UE receives from an E-SMLC an assistance data provide message including a reference cell PRS muting sequence indicating a muting pattern of a PRS transmitted by the reference cell and a neighbor cell PRS muting sequence indicating a muting pattern of a PRS transmitted by at least one neighbor cell. In step S120, the UE transmits to the E-SMLC an RSTD measured on the basis of a PRS received from the reference cell and the at least one neighbor cell. In this case, the reference cell muting sequence and the neighbor cell muting sequence can be configured by using various methods described above.

Figure 15:
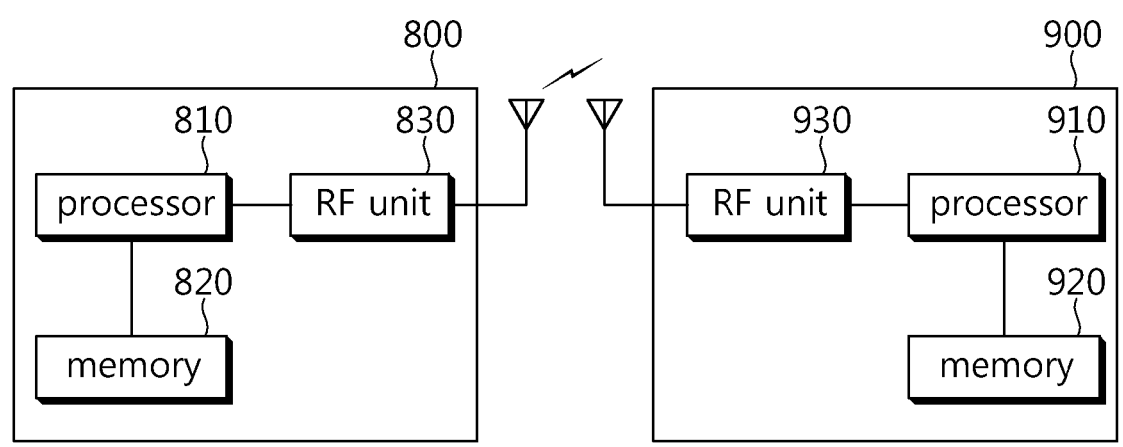
FIG. 15 is a block diagram showing wireless communication system to implement an embodiment of the present invention.

FIG. 15 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A user equipment 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting a message by a terminal in a wireless communication system, the method comprising:
    receiving from a location server an assistance data provide message including an assistance data reference cell positioning reference signal (PRS) muting sequence indicating a muting configuration of an assistance data reference cell and a neighbor cell PRS muting sequence indicating a muting configuration of at least one neighbor cell;
    receiving a PRS from the assistance data reference cell and the at least one neighbor cell based on the assistance data reference cell PRS muting sequence and the neighbor cell PRS muting sequence; and
    transmitting to the location server a reference signal time difference (RSTD) determined based on the PRS received from the assistance data reference cell and the at least one neighbor cell,
    wherein the assistance data reference cell PRS muting sequence and the neighbor cell PRS muting sequence are configured based on a system frame number (SFN) of the assistance data reference cell, and
    wherein a first bit of the assistance data reference cell PRS muting sequence and the neighbor cell PRS muting sequence corresponds to a first PRS occasion after the SFN of the assistance data reference cell becomes 0.

2. The method of claim 1, wherein the assistance data reference cell PRS muting sequence is configured based on a time of receiving the assistance data provide message.

3. The method of claim 2, wherein a first bit of the assistance data reference cell PRS muting sequence corresponds to a first PRS occasion after the assistance data provide message is received.

4. The method of claim 1, wherein the assistance data reference cell PRS muting sequence is configured based on the SFN of the assistance data reference cell obtained by decoding a physical broadcast channel (PBCH) transmitted from the assistance data reference cell.

5. The method of claim 1, wherein bits constituting the assistance data reference cell PRS muting sequence or the neighbor cell PRS muting sequence are all 1 or 0.

6. The method of claim 1, wherein the RSTD is a relative delay of a reference subframe including the PRS received from the assistance data reference cell and a neighbor subframe including the PRS received from the at least one neighbor cell and corresponding to the reference subframe.

7. The method of claim 1, further comprising transmitting to the location server an assistance data request message for requesting the assistance data provide message.

8. The method of claim 1, wherein the assistance data reference cell is a cell for which the SFN can be obtained by the terminal.

9. A terminal in a wireless communication system, the terminal comprising:
- a radio frequency (RF) unit for transmitting or receiving a radio signal; and
- a processor coupled to the RF unit,
- wherein the processor is configured for:
- receiving from a location server an assistance data provide message including an assistance data reference cell positioning reference signal (PRS) muting sequence indicating a muting configuration of an assistance data reference cell and a neighbor cell PRS muting sequence indicating a muting configuration of at least one neighbor cell;
- receiving a PRS from the assistance data reference cell and the at least one neighbor cell based on the assistance data reference cell PRS muting sequence and the neighbor cell PRS muting sequence; and
- transmitting to the location server a reference signal time difference (RSTD) determined based on the PRS received from the assistance data reference cell and the at least one neighbor cell,
- wherein the assistance data reference cell PRS muting sequence and the neighbor cell PRS muting sequence are configured based on a system frame number (SFN) of the assistance data reference cell, and
- wherein a first bit of the assistance data reference cell PRS muting sequence and the neighbor cell PRS muting sequence corresponds to a first PRS occasion after the SFN of the assistance data reference cell becomes 0.

10. The terminal of claim 9, wherein the assistance data reference cell PRS muting sequence is configured based on a time of receiving the assistance data provide message.

11. The terminal of claim 9, wherein the assistance data reference cell PRS muting sequence is configured based on the SFN of the assistance data reference cell obtained by decoding a physical broadcast channel (PBCH) transmitted from the assistance data reference cell.

12. The terminal of claim 9, wherein bits constituting the assistance data reference cell PRS muting sequence or the neighbor cell PRS muting sequence are all 1 or 0.

13. The method of claim 9, wherein the assistance data reference cell is a cell for which the SFN can be obtained by the terminal.

* * * * *